United States Patent [19]
Johnson

[11] Patent Number: 4,639,851
[45] Date of Patent: Jan. 27, 1987

[54] METHOD AND APPARATUS FOR FIRING ANGLE CONTROL OF SERIES CONNECTED THYRISTOR SWITCHES

[75] Inventor: Frederick O. Johnson, Monroeville Boro, Pa.

[73] Assignee: Westinghouse Electric Corp., Pittsburgh, Pa.

[21] Appl. No.: 727,174

[22] Filed: Apr. 25, 1985

[51] Int. Cl.$^4$ .................................. H02M 5/257
[52] U.S. Cl. .................................. 363/164; 363/50; 323/207
[58] Field of Search ............... 363/160, 161, 164, 165, 363/50; 323/207; 307/252 P, 252 Q, 252 T

[56] References Cited

U.S. PATENT DOCUMENTS 3,882,371  5/1975  Shimer et al. .................. 363/162
4,028,609  6/1977  Detering ........................ 363/129
4,100,434  7/1978  Iyotani et al. .................. 363/68

FOREIGN PATENT DOCUMENTS

1096752  6/1984  U.S.S.R. ........................ 363/160

Primary Examiner—Peter S. Wong
Assistant Examiner—Judson H. Jones
Attorney, Agent, or Firm—Charles M. Lorin

[57] ABSTRACT

To eliminate thyristor failure due to voltage imbalance across series-connected thyristors during reverse voltage recovery caused by current discontinuity under continuous pulse application to the thyristors, the continuous pulse is discontinued after a time interval of application which is a function of the control signal establishing the firing delay angle. The continuous pulse is reinstated as in a double-pulse mode, thereafter, with the same controlled duration.

6 Claims, 8 Drawing Figures

METHOD AND APPARATUS FOR FIRING ANGLE CONTROL OF SERIES CONNECTED THYRISTOR SWITCHES

BACKGROUND OF THE INVENTION

The invention relates to control of thyristor-controlled AC loads in general, and more particularly to control where series-connected thyristors are used.

Phase angle firing of thyristor switches is used to provide an adjustable voltage to an AC load such as a motor or a high voltage controlled rectifier circuit. The variable delay in firing the SCR's with respect to a reference voltage is used to provide variable voltage to the load. In high voltage applications, series-connected thyristors are used to obtain the necessary voltage support capability for the switch. Where two or more thyristors are connected in series, special management of the firing angle control for the thyristor switch is required to assure proper operation.

Because of the particular point at which conduction has started with respect to the phase voltage, the current will stop prior to simultaneous firing of the next pair of thyristors. This causes a current discontinuity. This current discontinuity is a function of the load and when the overlap situation is initiated. Current discontinuity is more apt to occur where the electrical load has a unity power factor. When the load current becomes discontinuous, the thyristors which were ON at this moment tend to commutate off or to recover while supporting reverse voltage. With series-connected thyristors forming a single overall switch combination, it is expected that the thyristors in the string will equally share the voltage developed across the switch element. It has been observed that under gate firing signals applied to such a string of thyristors the recovery process has a pronounced adverse effect upon the distribution of voltage among the series-connected thyristors. The resulting imbalance can result in excessive overvoltage on any one individual thyristor of the string, thereby causing failure.

SUMMARY OF THE INVENTION

Accordingly, it is now proposed to inhibit the gate firing signals to the thyristors during such critical periods when a current discontinuity might occur. This is effected at the point where the phase voltage applied to the thyristor string would reverse bias the thyristors.

Therefore, the object of the present invention is to prevent voltage imbalance in a string of series connected thyristor by removing gating at the critical moment where reverse recovery upon a string of series-connected thyristors might occur.

DETAILED DESCRIPTION OF THE INVENTION

A method and apparatus is hereinafter described for eliminating a condition that could cause voltage imbalance across series connected thyristors in a thyristor string or switch combination during reverse voltage recovery thereof. An AC firing angle control using coincident phase angle gate firing for a thyristor string in each phase produces a fixed frequency variable voltage output to an electrical load having a unity or lagging power factor. Circuitry is provided for removing the gate drive signal from the thyristor string for periods starting when the phase voltage applied thereto could reverse bias the thyristor string and ending with the next occurrence of coincident gate firing for that particular thyristor string. The AC firing angle control circuit has as inputs a reference control signal and a gate firing enable signal. The firing angle control circuit is responsive to the reference control signal for controlling the phase angle firing of the thyristors, the thyristors being responsive to the gate firing signals only when the gate firing enable signal is present. The phase angle firing of the thyristors is a function of the reference control signal such that the delay for the phase angle firing advances towards 0° as the reference signal increases toward a maximum value, the maximum delay in the phase angle corresponding to the minimum value for the reference signal that is necessary for coincident gate firing to occur. The gate firing enable signal is also a function of the reference signal. Generally, as the reference signal decreases, the duration of the gate enable signal decreases. The combination of the width modulated gate enable signal with the associated phase angle firing prevents the production of gate drive signals during the critical times when the thyristors may be undergoing reverse voltage recovery. The gate firing enable signal is removed until the next occurrence of coincident firing for the string of thyristors.

Figure 1:
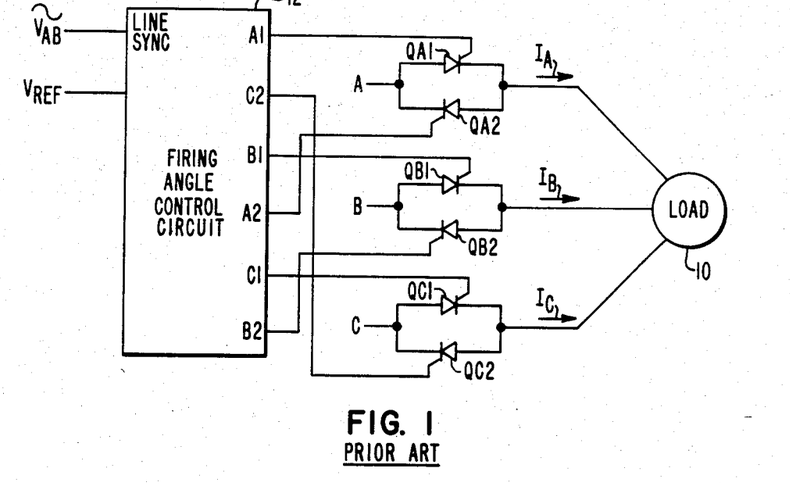
FIG. 1 is a simplified schematic representation of a coincident gate firing control of the prior art.
Figure 2:
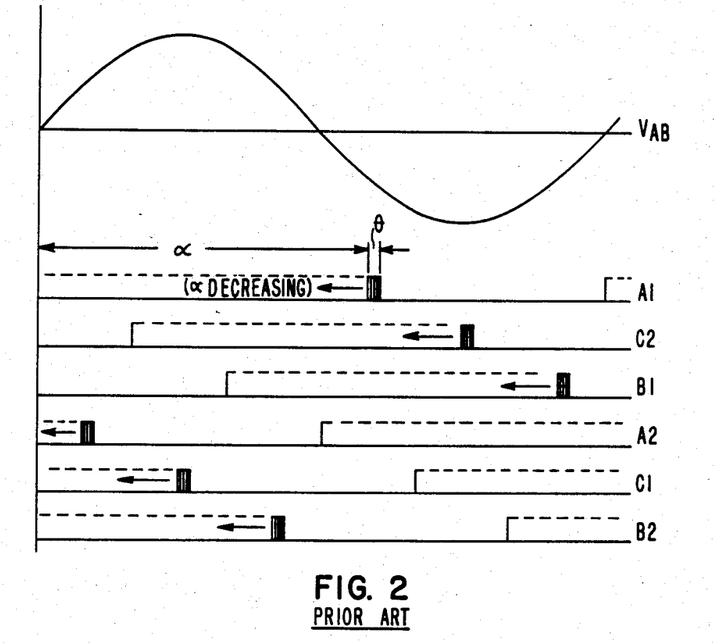
FIG. 2 illustrates the gate firing signal waveforms for the circuit of FIG. 1.

In a typical three-phase application, a six thyristor firing angle control utilizing sequential gate drive for a three-phase six-thyristor set is used to provide a variable voltage to the electrical load. This is shown in FIG. 1. There, the three electrical phases A, B and C are interconnected to the three-phase load 10 via six thyristor strings are shown allowing for the conduction of the three phase load currents $I_A$, $I_B$ and $E_C$. For the sake of simplicity, each thyristor string is shown as a single thyristor (QA1, QB1, QC1) connected in anti-parallel with another string represented also by a single thyristor (QA2, QB2, QC2). Thus, each thyristor in the Figure actually represents two or more series connected thyristors. Each phase is provided with a pair of anti-parallel thyristor strings. These are QA1 and QA2, QB1 and QB2, and QC1 and QC2 for phases A, B and C, respectively under the prior understanding that QA1 represents at least two thyristors in series, and so on for QA2, QB1, QB2, QC1 and QC2. The gates of each thyristor assembly are controlled by the output of a firing angle control. The gates of QA1 and QA2, respectively, are controlled by the corresponding outputs A1 and A2 of the firing angle control 12. Gates B1, B2, C1, and C2 are similarly controlled by the firing angle control 12. A timing wave reference voltage $V_{AB}$ derived illustratively, between phase lines A and serves as an input to the firing angle control circuit and synchronizes the gate control signals to the line frequency. The output $V_{REF}$ of a closed loop controller serves as the reference signal for the operation of the firing angle control circuit 12. The firing angle delay $\alpha$ for each of the gating signals determine the position of the leading edge thereof as illustrated in FIG. 2. When the reference signal is at a minimum value, the firing angle delay $\alpha$ is set at a maximum value up to 360°. However, in most applications, the firing angle delay is initially less than 240° with respect to the positive going zero-crossing of the voltage waveform (see for instance U.S. Pat. No. 4,028,609). As the reference signal increases in magnitude, the firing angle control circuit 12 advances the firing angle delay $\alpha$ causing the leading edge of the gate firing signal to advance, thus increasing the width $\theta$ of the gate firing signal. In normal operation, as the firing angle position $\alpha$ decreases, the width $\theta$ of the gate firing signals will increase, as indicated by arrows directed to the left, to a maximum value of 120°. Thereafter, upon further advance of the firing angle delay $\alpha$, the width $\theta$ of the gate firing signals will be held at 120°, causing the trailing edge of each of the gate control firing signals to track the movement in the firing angle delay $\alpha$. The gate firing signals may consist of extended pulse signals, i.e. a single signal having a pulse-width $\theta$, or consist of a series of picket fence signals, that is a series of high frequency pulses occurring close to one another within an envelope of width $\theta$. (See for instance U.S. Pat. No. 4,028,609.)

Figure 3:
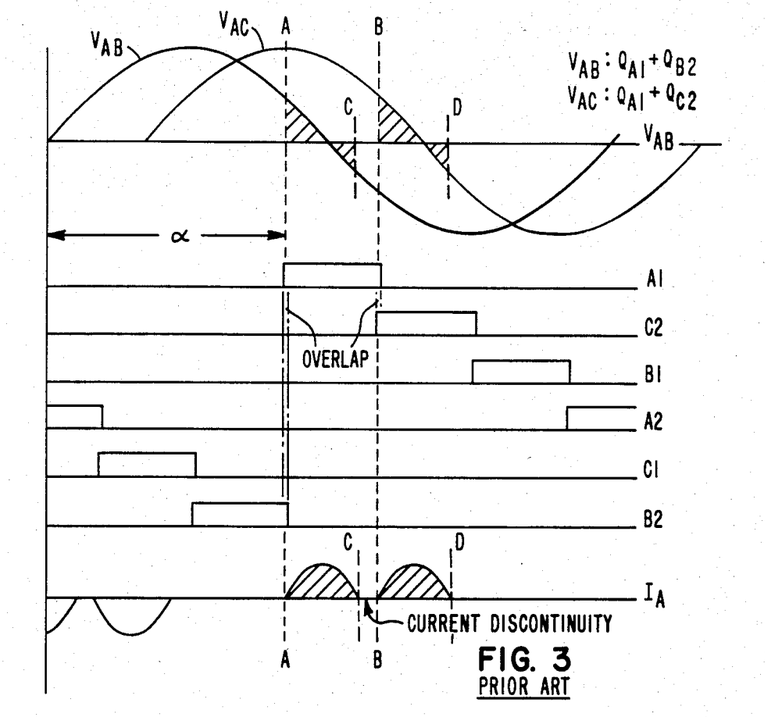
FIG. 3 illustrates the gate firing signal waveforms and the current waveform during coincident firing of the circuit of FIG. 1.
Figure 5:
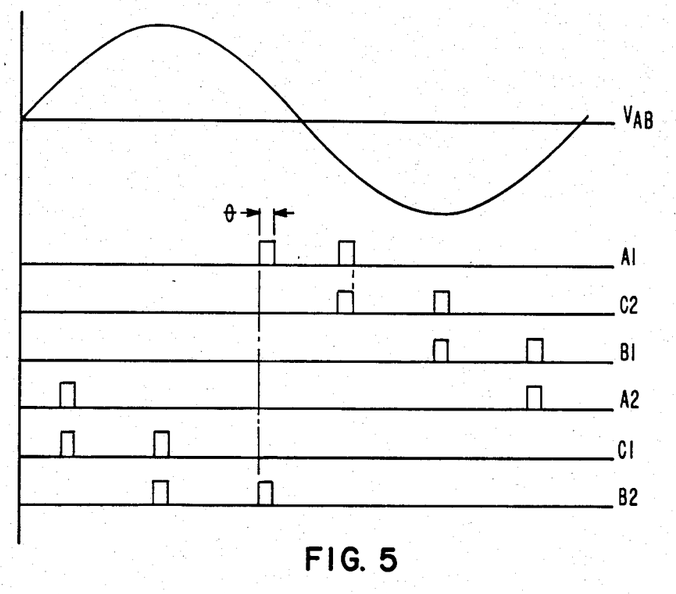
FIG. 5 illustrates the waveforms for a double-pulsed gate firing signal control system.

In practice, no output voltage to the load is obtained until the firing angle delay $\alpha$ advances sufficiently to establish overlap, or there is coincidence between gate firing signals of opposite phase lines related pairs of thyristor strings so as to enable line-to-line current paths. Overlap of continuous gate drive signals is shown in FIG. 3 whereas coincidence of double pulse is shown in FIG. 5. The "continuous" pulse and the "double-pulse" approach for gating thyristors is generally known. See for instance: Robert Chauprade, pages 112 to 115 in "COMMAND" ELECTRONIQUE DES MOTEURS A COURANT CONTINU" EYROLLES 1975. At point A in the figure, both QA1 and QB2 are forward biased allowing for current $I_A$ to flow to the load.

Figure 4:
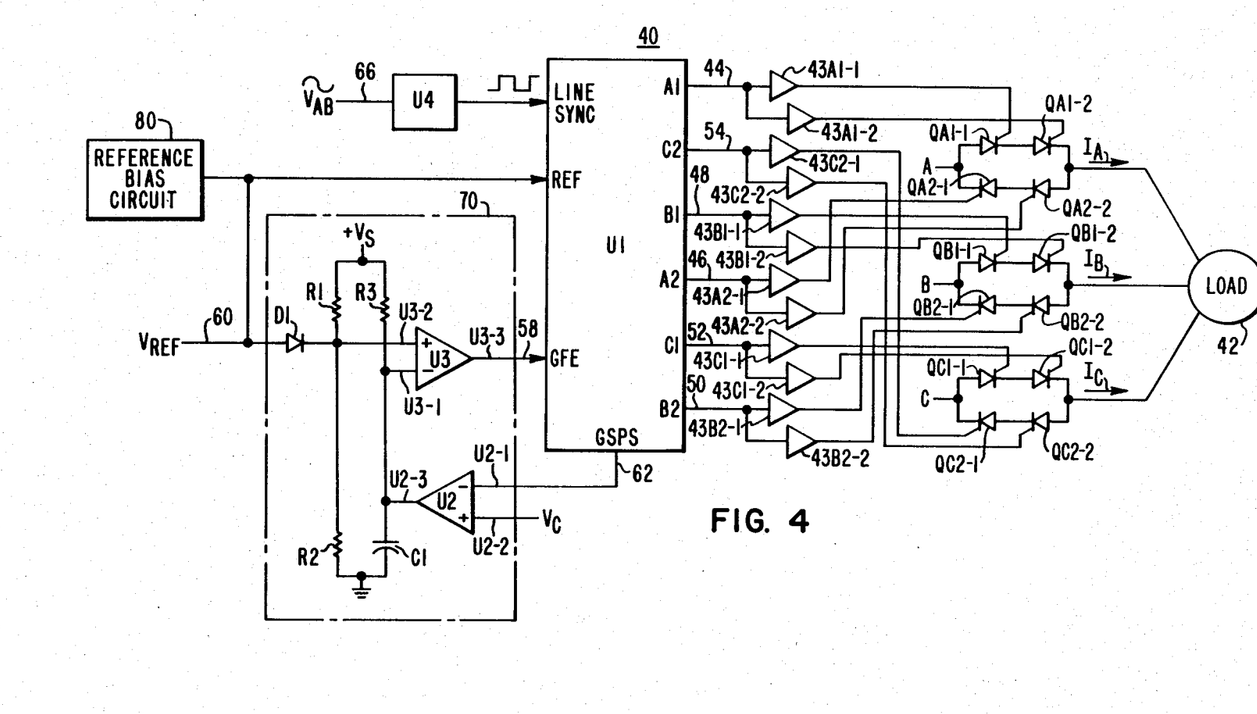
FIG. 4 is a simplified schematic representation embodying the present invention.

Thus it was found that the presence of gate firing signals upon the series-connected thyristors of a thyristor string leads to a risk for the tyristors due to voltage imbalance across the thyristors during reverse voltage recovery. Removing or inhibiting the gate firing signals during such critical period is the object of the present invention. Shown in FIG. 4 is a simplified schematic representation embodying the present invention. The firing angle control system 40 consists of a firing angle control circuit U1 that uses an input reference signal to generate gate firing signals for operating thyristor switch elements. These in turn control the voltage to an electrical load such as a motor. The reference signal represents a desired operating state for the electrical load. The control circuit U1 is designed to control the phase angle and pulse width of the gate firing signals. This achieves the desired operating condition. As is well known, the phase angle of the gate firing signals with respect ot the phase voltage is used to control the voltage applied to the load. Typically, the control circuit is designed to increase the voltage to the load as the phase angle of the gate firing signals is advanced toward zero. Phase angle firing control circuits are well known. Therefore, circuit U1 which is one of three will be described only by its function. For purposes of illustration, the firing angle control circuit U1 is shown to be a 6-pulse gate firing control device as used for the control of a three-phase AC load 42, preferably having a unity or lagging power factor. In each phase line are thyristor switch strings composed of antiparallel combinations of two series-connected thyristors. For phase A, QA1-1 and QA1-2 are connected in series, and together these are connected in antiparallel with a similar series-combination of thyristors QA2-1 and QA2-2. Similarly for phase B, thyristors QB1-1 and QB1-2 are in series and connected in antiparallel with thyristors QB2-1 and QB2-2. A similar arrangement exists for series-connected thyristors QC1-1 and QC2-1 that are connected in antiparallel with the series-connected thyristors QC2-1 and QC2-2 for phase C.

On a positive-going voltage, thyristors QA1-1 and QA1-2 would be forward biased, while the antiparallel combination of thyristors QA2-1 and QA2-2 would be reversed biased. A similar situation exists for phases B and C. Being antiparallel, the thyristors are connected anode-to-cathode at each end of the string, rather than anode-to-anode at one end and cathode-to-cathode at the other end. This permits control of the load during both positive and negative-going segments of the phase voltage and current waveforms. To simplify, the snubber and protection circuits normally provided in parallel with each thyristor are not shown.

The gate of each thyristor is connected to the output of an amplifier (43A1-1, 43B2-2). The input to the amplifier is connected to one gating lines 44, 46, 48, 50, 52, 54 for gate firing output signals of the firing control circuit U1. The gate firing signal output pin A1 of U1 serves as the input to amplifiers 43A1-1 and 43A1-2, the outputs of which are connected to the gates for thyristors QA1-1 and QA1-2, respectively. The gate firing signal output pin A2 serves as the input to amplifiers 43A2-1 and 43A2-2, the outputs of which are connected to the gates for thyristors QA2-1 and QA2-2, respectively. The gate firing signal output pin B1 serves as the input to amplifiers 43B-1 and 43B1-2, the outputs of which are connected to the gates for thyristors QB1-1 and QB1-2, respectively. The gate firing signal output pin B2 serves as the input to amplifiers 43B2-1 and 43B2-2, the outputs of which are connected to the gates of thyristors QB2-1 and QB2-2, respectively. The gate firing signal output pin C1 serves as the input to amplifiers 43C1-1 and 43C1-2, the outputs of which are connected to the gates for thyristors QC1-1 and QC1-2, respectively. The gate firing signal output pin C2 serves as the input to amplifiers 43C2-1 and 43C2-2, the outputs of which are connected to the gates for thyristors QC2-1 and QC2-2, respectively.

Inputs to the firing angle control U1 include (1) a line sync signal on line 56 that is used to synchronize the gate firing signals to the electrical system supplying power to the load 42 via the thyristor switches, (2) a gate firing enable (GFE) signal on line 58 the function of which will be explained hereinafter, and (3) a reference signal $V_{REF}$ 60. The line sync signal of line 56 to the firing angle control circuit U1 is provided via a circuit U4 which is a sine wave to square wave converter. Any one of the phase line voltages can serve as a timing wave reference for input line 66 to converter U4. Illustratively, line-to-line voltage $V_{AB}$ is used as timing reference for input line 66. The phase voltage $V_{AB}$ can be phase shifted to obtain any desired initial phase relationship of the gate firing signal outputs A1–C2 of the control circuit U1 with respect to the phase voltage $V_{AB}$. Generally, the Signal $V_{REF}$ is generated by a control system (not shown) that is used to control a larger system of which the load 42 and the firing angle control circuit are a subsystem. For example, if the load 42 is a motor for a belt conveyor system, a closed-loop control may monitor the speed of the belt and produce a reference signal applied here to U1 in order to increase, or decrease, motor speed and maintain a certain belt speed regardless of the material loading on the conveyor. In addition to the aforestated gate firing signal outputs, the firing angle control circuit U1 also provides on its pin GSPS and on line 62 an output signal termed "gate-start pulse signal" (GSPS). This is a pulse signal that occurs on the leading edge of each of the newly-produced gate firing signals A1 through C2. The signal of line 62 is a binary signal.

The gate start pulse signals GSPS of line 62 and the reference signal of line 60 are used by a gate firing enable circuit 70 to produce the gate firing enable signal 58. The gate firing enable circuit 70 consists of two voltage comparators U2 and U3, of a voltage divider consisting of the series-combination of resistors R1 and R2 connected between a supply voltage source $V_S$ and ground and of a timing circuit consisting of the series-combination of a resistor R3 and a capacitor C1 connected between the supply voltage $V_S$ and ground. Serving as inputs to voltage comparator U2 are the gate-start pulse signal 62 and a selectable reference voltage $V_C$ applied on input lines U2-1 (inverting) and U2-2 (non-inverting), respectively. The reference voltage $V_C$ can be generated by connecting the input U2-2 to the midpoint of a voltage divider consisting of two resistances connected between the supply voltage $V_S$ and ground. The ratio of such resistances would set the vlaue of $V_C$. The voltage $V_C$ defines a threshold value allowing comparator U2 to respond to the binary output states of the gate-start pulse signal 62. The output U2-3 of comparator U2 is connected at the junction between resistor R3 and capacitor C1. This point also serves as input to voltage comparator U3 at inverting input U3-1. The non-inverting input U3-2 of voltage comparator U3 is connected to the junction between resistors R1 and R2 of the voltage divider. Also connected at this point is the cathode of diode D1 that has its anode connected to the reference line 60 carrying signal $V_{REF}$. The output U3-3 of voltage comparator U3 provides the gate firing-enable signal 58 upon pin GFE of the firing angle control circuit U1.

Figure 6:
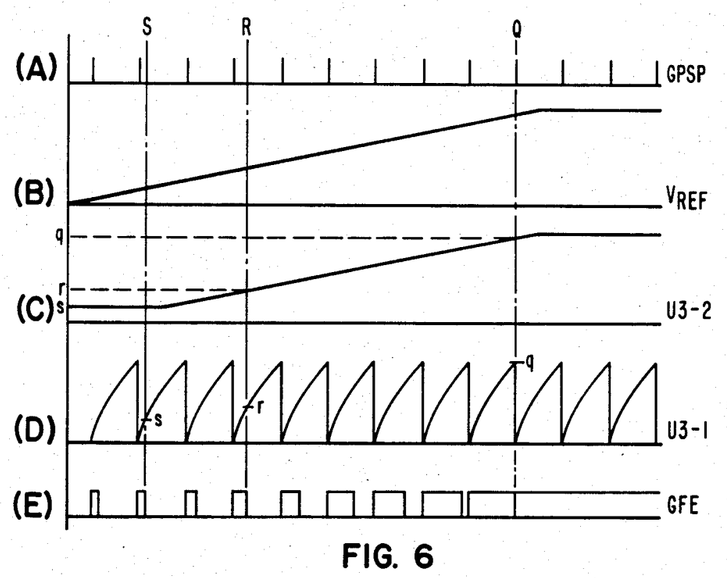
FIG. 6 illustrates operating waveforms for the circuit of FIG. 4.
Figure 7:
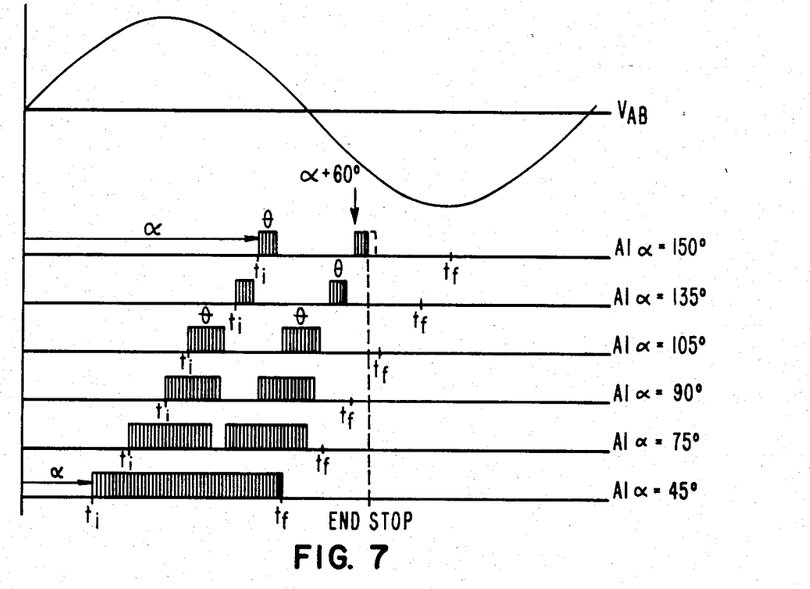
FIG. 7 illustrates the effect produced by an increasing reference signal on the gate firing signals firing angle position.

In operation, the phase angle firing control circuit U1 produces sequential gate firing signals for the operation of the thyristor strings. For the system shown, it will be realized that at least two strings of the six strings of thyristors will have to be gated ON in order for current conduction to occur. One possible gate firing sequence would be A1 (for QA1-1 and QA1-2), C2 (for QC2-1 and QC2-2), B1, A2, C1, B2, with the gate firing signals overlapping as shown in FIG. 3 by extending the gate firing signals, or by using the technique of double pulsing the gate firing signal as shown in FIG. 5. With double-pulsing, two pulses, the last and the next, are used simultaneously to create a coincidence situation. The width $\theta$ of each pulse is dependent upon the magnitude of the reference signal. With the six-pulse system illustrated, the double pulses for each gate firing signal would be typically separated by 60°. This can vary however during transient movement of the firing angle delay. For either type of gate firing, gate firing pulses will start six times in each cycle. Thus, for a 60 cycle unit, the frequency of pulses will be 360 pulses per cycle. This is the frequency at which the gate-start pulses signal 62 is synchronously occurring. This occurrence is shown by the top curve of FIG. 6 as a series of pulses. For purposes of illustration, the reference signal $V_{REF}$ is shown by curve B of FIG. 6 as a signal increasing linearly over a given period of time. Curves C and D represent, respectively, the input U3-2 and the input U3-1 of voltage comparator U3. Curve E represents the gate firing-enable signal of line 58, that is, the output U3-3 of comparator U3. When the value of the GSPS signal of line 62 is such on input U2-1 of voltage comparator U2 that it exceeds the reference voltage $V_C$, output line U2-3 of comparator U2 will go LOW momentarily thereby discharging capacitor C1 and simultaneously making the input U3-1 of voltage comparator U3 go to a Zero. At this instant, the voltage generated by the voltage divider R1 and R2 on the input U3-2 to the voltage comparator U3 will cause the output U3-3 to go HIGH allowing for gate firing to occur. The width of the gate firing enable signal pulse 58 is determined by the rate at which thereafter capacitor C1 charges up as determined by the RC timing network consisting of R3 and capacitor C1. When the voltage across the charging capacitor C1 reaches the voltage present at the input U3-2 of the comparator U3, the output U3-3 of the comparator U3 will go LOW thus putting an end to the gate-firing enable signal pulse of line 58. The intersection of voltage $V_{REF}$ with the charging curve of capacitor C1 is illustrated at points R and S in FIG. 6. It is seen that as the magnitude of the reference signal increases (curves B), the width for the gate firing enable signal pulse 58 increases (curves E) until a point when the gate firing-enable signal pulse has become constantly present. This condition is shown to be reached at point Q on FIG. 6. The reference signal can increase in magnitude beyond this point but there will be no further effect to increase the width of the gate firing enable pulse, since the pulse in fact is continually present. When the reference signal $V_{REF}$ is less than the voltage appearing across R2, a voltage across R2 is provided to determine a minimum width for the GFE signal 58. This is illustrated by curve C and point S on the curves of FIG. 6. The reference signal $V_{ref}$ is biased to establish the phase angle firing position at a minimum point of overlap. This is illustrated in FIG. 4 by a bias circuit 80. The particular design of the bias circuit 80 is dependent on the character of the reference signal and can be either a current or voltage bias circuit. This bias establishes for a given minimum reference value the maximum value for the delay $\alpha$ in the phase angle firing of the thyristor switch element typically 150° as shown in FIG. 7. The phase angle firing delay $\alpha$ determines the firing angle position of the thyristor switch string. Both the firing angle position and the phase angle firing delay are designated by the symbol $\alpha$ and are used interchangeably.

During operation, as the magnitude in the reference signal $V_{ref}$ increases, the firing angle position $\alpha$ in the phase angle firing for the gate pulses is advanced by the firing angle control U1. This is shown in FIG. 7 for a series of curves based on a continuous pulse of duration $t_i$ to $t_f$ for firing angle positions of 150°, 135°, 105°, 90°, 75° and 45° in the gate firing signal A1. At the same time, recourse is made to a technique similar to the double-pulse technique namely the continuous pulse is discontinued after a time interval $\theta$ and a second pulse occurs at $(\alpha+60°)$, with the same duration $\theta$. However, it should be realized that here as the firing angle advances towards zero degrees, the magnitude of the reference signal is increasing therefore increasing the width of the gate firing enable signal. This in turn provides for a longer period (reading up to 180°) during which the gate firing signals are produced as shown in FIG. 7. It will be appreciated that like in a double-pulse situation no gate firing signals are present when the applied phase voltage could reverse bias the thyristors. The various waveforms reveal that the width of the gate firing enable signal is at a minimum when the angle firing delay $\alpha$ is at its maximum (150° in FIG. 7). This ensures the elimination of gate firing signals during the period of time when the reverse voltage recovery is most likely to occur. However, as the phase angle delay $\alpha$ advances toward smaller values, the likelihood of gate firing during periods of reversed voltage recovery decreases, which allows for a longer time period within which the gate firing signals can occur. FIG. 7 can be compared with FIG. 6 to the extent of the intersections at points s, r or q.

Figure 8:
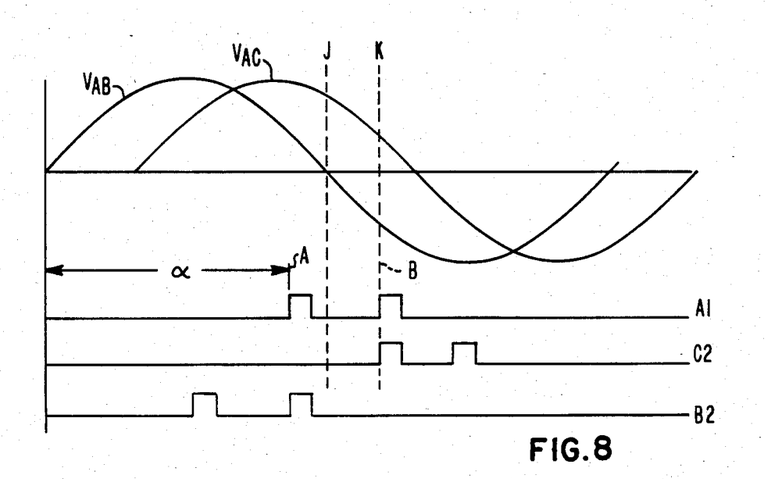
FIG. 8 illustrates the elimination of the gate firing signals during a possible reverse recovery condition.

FIG. 8 illustrates the elimination of thyristor gating during the period in which reverse voltage recovery could occur. The waveforms for the phase voltages $V_{AB}$ and $V_{AC}$ together with the gate firing enable signals A1 and C2 are illustrated. The maximum firing angle delay $\alpha$ is approximately 150°. The thyristors QA1-1, QA1-2 QB2-1 and QB2-2 are used to develop the current to the load. With the present invention, the gate drive signals to the set of thyristors, as opposed to the situation in FIG. 3, are removed at the time the phase voltage $V_{AB}$ could reverse bias the thyristors. This occurs at point J. At point K the phase voltage $V_{AB}$ could still reverse bias the thyristors; however, the phase voltage $V_{AC}$ would not. Thus the thyristors QA1-1 and QA1-2 can receive gate drive signals if the thyristors QC2-1 and QC2-2 are also brought into conduction. Similar reasoning is applicable to the occurrence of gate firing signals for the other phases.

With the present invention, either an extended pulse type gate drive or a picket fence gate drive may be utilized. In picket fence gate drive, the gate firing signals are a series of high frequency pulses that are presented to the gates of the thyristors in the thyristor strings. Where the picket fence type gate drive is utilized, the gate firing enable signal is synchronized to the leading edge of the oncoming pulse within the gate firing signal. This avoids abbreviated gate drive pulses to the thyristors that can damage the thyristors. With the extended pulse gate drive, this synchronization is not critical. Also with the present invention, there is a 1:1 correlation between the reference signal and the firing angle delay $\alpha$. The relationship between the delay $\alpha$ and the reference signal may be a linear or non-linear single valued function.

To summarize:

Circuitry is provided for removing the gate firing signal from the thyristor string for periods starting when the phase voltage applied thereto could reverse bias the thyristor string and ending with the initiation of another gate firing signal for that particular thyristor string. The AC fitting control circuit has as inputs a reference control signal and a gate firing enable signal. The firing angle control circuit is responsive to the reference control signal for controlling the phase angle firing of the string of thyristors with the thyristors being responsive to the gate firing signals only when the gate firing enable signal is present. The phase angle $\alpha$ firing of the thyristors is a function of the reference control signal $V_{REF}$ such that the delay for the phase angle firing advances towards 0° as the reference control signal increases toward a maximum value with the maximum delay in the phase angle $\alpha$ corresponding to the minimum value for the reference control signal, $V_{REF}$, as is necessary for coincident gate firing to occur. The gate firing enable signal is removed until the second gate firing signal for the string of thyristors.

I claim:

1. In an AC firing angle control circuit having as inputs thereto a reference control signal and a gate firing enable signal for producing a fixed frequency, variable voltage output to an electrical load having a unity or lagging power factor via a thyristor string in each phase having at least two series-connected thyristors with the firing angle control circuit using coincident sequential gate firing signals for the phase angle firing of the thyristor string, the firing angle control being responsive to the reference control signal for controlling the delay for the phase angle firing of the thyristor: with the thyristors being responsive to the gate firing signals only when the gate firing enable signal is present, a method for preventing voltage imbalance across the series connected thyristors during reversed voltage operation thereof, comprising:

controlling the phase angle firing of the thyristors as a function of the reference control signal such that the delay for the phase angle firing advances toward 0° as the reference signal increases toward a maximum value with the maximum delay in phase angle corresponding to the minimum value for the reference signal that is necessary for coincident sequential gate firing to occur thereby providing current to the electrical load; and controlling the gate firing enable signal as a function of the reference signal such that, as the reference signal decreases, the length of presence of the gate enable signal decreases so that, whenever the delay in the phase angle firing determined by the reference signal would cause the string of thyristors to be fired at a time when the thyristors are reversed biased by the applied phase voltage, the gate firing enable signal is removed until the next occurrence of coincident sequential firing for the string of thyristors.

2. An improved phase angle firing control system for a thyristor controlled AC electrical load having a unity or lagging power factor, comprising:

a string of thyristors connected in series with each phase of the electrical load, each string having at least two thyristors connected in series;

AC firing angle control means for producing a fixed frequency, variable voltage to the electrical load and having a reference control signal and a gate firing enable signal as inputs and gate firing signals as outputs, a gate firing signal provided to each thyristor gate with the timing of the gate firing signals producing coincident sequential phase angle firing of the thyristor strings when the gate firing enable signal is present, the firing angle control means using the magnitude of the reference signal for determining the delay in the phase angle for firing of the thyristors;

reference signal means for producing said reference signal for controlling the operation of the electric load;

means for producing said gate firing enable signal, the presence thereof allowing the thyristors to be fired by the gate firing signals; and means for inhibiting said gate firing enable signal whenever the delay in the phase angle firing determined by the reference signal would cause the string of thyristors to be fired at a time when the thyristors are reversed biased by the applied phase voltage, with the gate firing enable signal being inhibited until the next occurrence of coincident sequential firing for the string of thyristors, thereby preventing thyristor stress due to voltage imbalance across the series-connected thyristors during reversed voltage operation;

wherein the firing angle control means advances the delay in the phase angle toward 0° as the magnitude of the reference signal approaches a maximum value with the maximum delay in phase angle corresponding to the maximum value for the reference signal that is necessary for coincident sequential gate firing to occur thereby providing current to the electrical load; and the means for inhibiting the gate firing enable signal inhibits the gate firing enable signal such that as the magnitude of the reference signal decreases the length of presence of the gate enable signal decreases so that whenever the delay in the phase angle firing determined by the reference signal would cause the string of thyristors to be fired at a time when the string of thyristors are reversed biased by the applied phase voltage, the gate firing enable signal is removed until the next occurrence of coincident sequential firing for that string of thyristors.

3. In a pulse generator for firing in sequence a plurality of strings of thyristors connected in series, each of said strings being connected in a corresponding phase line of an AC load to be controlled by said thyristors; the combination of:

means for initiating a continuous pulse for firing a string "next" in the firing sequence;

means responsive to a control signal for establishing a delay angle $\alpha$ for the initiation of said continuous pulse; and means for disabling said delayed continuous pulse after a time interval $\theta$ of duration in relation to said control signal;

with said initiating means being operative to initiate firing upon said "next" string of thyristors first with said delay angle $\alpha$, and secondly with said delay angle plus the time interval between two consecutive AC phases in the sequence of firing said strings of thyristors;

with said disabling means establishing a time interval $\theta$ which is inversely related to said delay angle $\alpha$;

with a minimum and constant time interval $\theta$ being established above a predetermined maximum value of said delay angle $\alpha$.

4. The pulse generator of claim 3 with said time interval $\theta$ having a maximum and constant value below a predetermined minimum value of said delay angle $\alpha$.

5. The pulse generator of claim 3 with the delay angle $\alpha$ having a maximum predetermined value and an END STOP being applied to said continuous pulse.

6. The pulse generator of claim 5 with said disabling means being inoperative when said control voltage has reached a predetermined minimum value.

* * * * *